Oct. 1, 1957   J. E. HECKETHORN   2,808,131
SHOCK ABSORBER WITH RESERVOIR BAFFLE
Filed Aug. 23, 1955
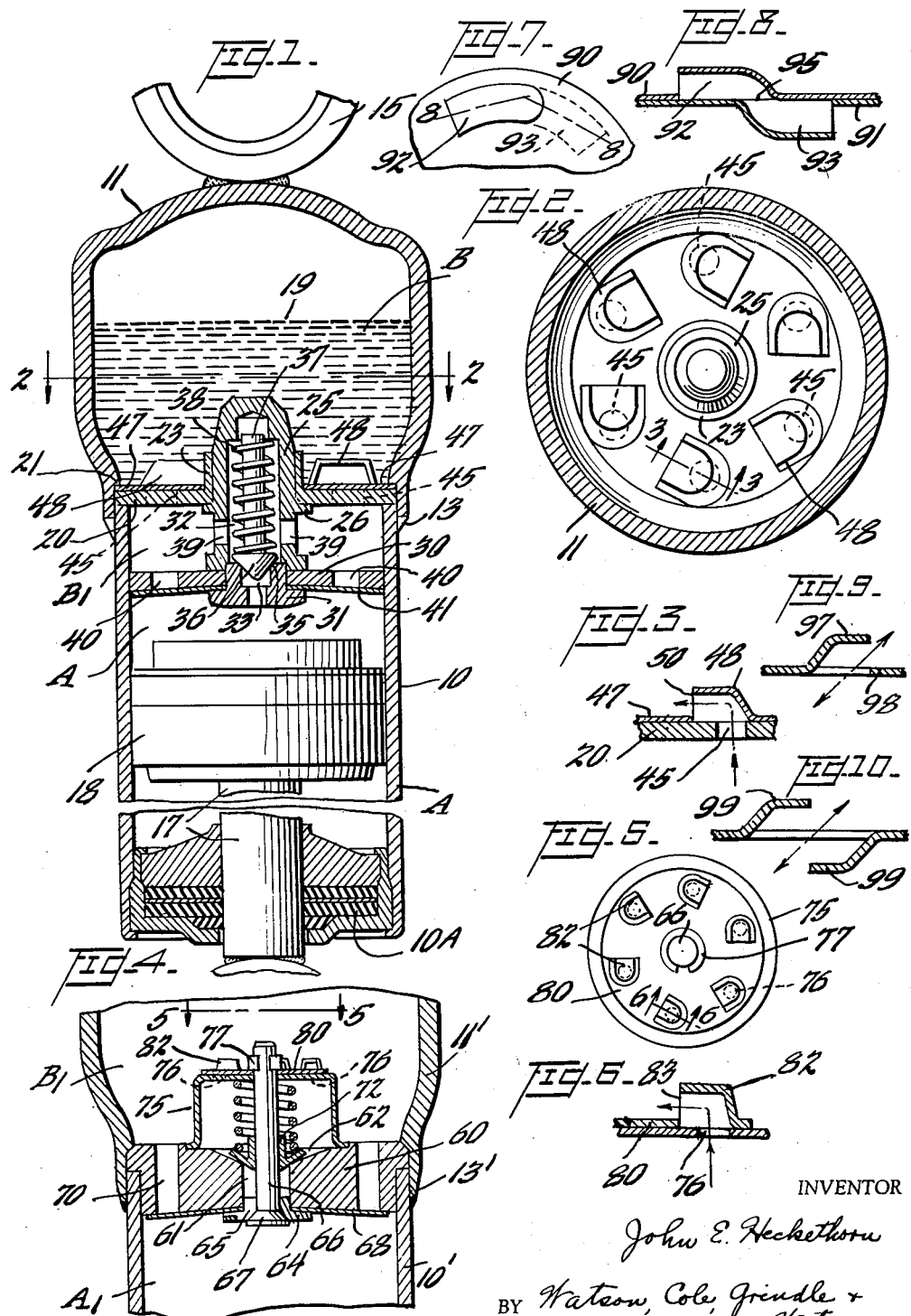
INVENTOR
John E. Heckethorn
BY Watson, Cole, Grindle & Watson
ATTORNEYS

United States Patent Office 2,808,131
Patented Oct. 1, 1957

2,808,131

SHOCK ABSORBER WITH RESERVOIR BAFFLE

John E. Heckethorn, Denver, Colo., assignor, by mesne assignments, to Christian Marie Lucien Louis Bourcier De Carbon, Neuilly-sur-Seine, France Application August 23, 1955, Serial No. 530,107

6 Claims. (Cl. 188—100)

This invention relates to shock absorbers and more particularly to valving and deflecting arrangements which control and regulate the flow of pressure fluid, especially in the cavitation control chamber or expansion reservoir of the shock absorber.

The general object of the invention is to provide novel baffle and deflector structures which serve effectively to minimize turbulence in the working fluid continually passing in opposite directions through the expansion chamber valving system of the shock absorber.

The invention in its preferred embodiment contemplates the provision of a baffle device comprising a plate or partition provided with openings through which the fluid may flow into and/or out of the expansion chamber. Such openings may be provided in any suitable number, and if more than one are provided, as in the preferred form, they are preferably arranged symmetrically with respect to the axis of the shock absorber, as for example in a circular series as illustrated in the drawings accompanying the present application. Each of the openings is provided with a tangentially directed cupped or hooded spout or discharge outlet means, and all of this arrangement being disposed below the minimum level of the fluid in the expansion chamber of the shock absorber, so as to impart a swirling action in the reserve fluid contained therein.

It is well known in the art that a shock absorber designed for operation with a liquid damping medium will not function efficiently if that medium is allowed to emulsify and produce foaming. The intermittent discharge of the fluid in the expansion chamber upon the occurrence of the compression stroke, and the return flow during the rebound stroke of the piston, all at very high frequency and velocity during vehicular travel on rough roads, tends to produce such deleterious foaming, and this is especially true where the fluid is permitted to jet or gush upwardly into the expansion chamber and break through the surface of the body of liquid and splash about in the reservoir chamber.

By means of the ingenious provisions of the present invention, the discharge of liquid damping fluid into the expansion or cavitation chamber is effected in tangential directions within the preferably cylindrical chamber and a swirl or horizontal circular motion is produced which is communicated to much of the body of liquid in the expansion chamber and gushing or splashing is prevented.

In certain embodiments of the invention, this swirling movement is reversed upon recession of the liquid upon the occurrence of the rebound stroke, while in other installations separate return flow means are provided and the swirling action occurs only in one direction, that is during the compression stroke.

Prior attempts have been made to reduce or minimize foaming in conventional shock absorbers having annular reservoir chambers surrounding the working cylinder of the shock absorber, and these have taken the form of helical baffles—some in the form of coil springs—which substantially divide the thin annular shell-like chamber into separate helical sub-chambers, but such installations relate to quite different problems and different solutions from those involved in the present type of shock absorber, where the expansion chamber is a cylindrical chamber, and more especially where the swirl in such a chamber is produced by the provision of one or more tangentially arranged jets.

Other objects and features of novelty will be apparent from the following specification when read in connection with the accompanying drawings in which certain embodiments of the invention are illustrated by way of example.

In the drawings:

Figure 1 is a view in vertical section through a direct acting shock absorber embodying the principles of the invention;

Figure 2 is a horizontal sectional view taken on line 2—2 of Figure 1;

Figure 3 is a fragmentary vertical sectional view taken on line 3—3 of Figure 2;

Figure 4 is a detail sectional view taken adjacent the junction of the working chamber and the expansion chamber of a shock absorber of somewhat different form but otherwise following the same general consrtuction as the one illustrated in Figures 1–3 inclusive;

Figure 5 is a top plan view of the anti-foaming arrangement of Figure 4 as viewed from line 5—5 of that figure;

Figure 6 is a fragmentary vertical sectional view taken on line 6—6 of Figure 5;

Figures 7 and 8 are fragmentary plan and vertical sectional views of a further modification; and Figures 9 and 10 are fragmentary sectional views of theoretical jets which represent unsatisfactory arrangements.

Although the principles of the invention are applicable to a wide variety of shock absorbers without regard to the shape and configuration of the working and expansion chambers, the invention has particular applicability to the shock absorbers exemplified by the following copending applications of C. M. L. L. Bourcier de Carbon, Serial No. 145,788, filed February 23, 1950, now Patent No. 2,719,612, granted October 4, 1955; Ser. No. 252,488, filed October 22, 1951, now Patent No. 2,757,762, granted August 7, 1956; and Ser. No. 398,593, filed December 16, 1953.

In the form illustrated in Figures 1, 2 and 3 of the drawings, the cylindrical portion of the casing of the shock absorber which surrounds the working chamber A is designated 10 and the domed head of the casing is shown at 11, these two parts being interfitted and joined as at 13 by welding.

A securing ring 15 is fixed to the upper end of the casing whereby it is attached to one of the members, the movement of which is to be damped; and a similar ring (not shown) may be provided at the lower end of the piston rod 17, which rod, as is well known, passes through a packed opening in the lower end of the casing. A suitable packing installation is indicated generally by the reference numeral 10A, and is similar to that shown in the copending De Carbon application Ser. No. 270,587, filed February 8, 1952, now Patent No. 2,765,877, granted October 9, 1956.

The piston rod carries a piston 18 of suitable construction for damped movement through the body of fluid in the working chamber A. Suitable means for by-passing fluid from one side of the piston to the other are provided, but these form no part of the present invention. It is sufficient to point out that upon the occurrence of each compression stroke of the shock absorber, as when a vehicle encounters a bump or obstruction in the road, the piston 18 and its rod 17 move upwardly, and successive increments of the piston rod 17 enter the working chamber, and of necessity displace an equivalent volume of working fluid from that chamber. In this type of shock absorber valving means are provided between the working chamber A and the expansion chamber or reservoir B enclosed in the dome 11 of the casing. The surface line 19 indicates the approximate level of the working fluid in the expansion chamber corresponding to the position of the piston 18 shown in this figure of the drawings. This level will rise or fall as more or less of the piston rod occupies space in the working chamber.

The means for partitioning the working chamber from the expansion chamber and valving the fluid therethrough will now be described.

An annular plate or disc 20 is gripped between the end of the chamber wall 10 and a shoulder 21 formed on the rim of the cap or dome portion 11, when the two casing parts are joined together. In the particular form of the invention shown, the central opening formed in the valve disc 20 is flanged as at 23, and a stem or plug 25 is secured within the flanged opening as by means of a forced fit, a flange 26 limiting the movement of the plug into the opening. The plug or stem 25 carries at its lower end a partition plate 30, this plate being secured to the lower end of the stem as by means of the cap or plug member 31. The stem 25 is hollow to provide a valve chamber 32 therein, and the plug 31 is provided with a central passageway 33. The shoulder 35 at the inner end of the plug provides a seat for the conical head 36 of the valve whose stem 37 is surrounded by the coil spring 38 within the valve chamber 32. One or more outlet openings 39 to provide communication between the chamber 32 and the lower portion of the expansion chamber 11 is designated B'.

The coil spring 38 controlling the valve 36 is selected in accordance with the resistance to displacement of fluid prescribed in the particular shock absorber for the use to which it is to be put. This valve serves to resiliently and yieldingly resist the compression movement of the piston 18 due to the displacement of fluid by the progressive entrance of the piston rod 17 and the working chamber.

For return flow of working fluid from the reservoir or expansion chamber B, B', a series of openings 40 is provided in the partition 30, and return flow through these openings is subjected to only very slight resistance by means of the thin disc valve 41 which covers the lower ends of these openings. The perforated central portion of the valve disc surrounds the neck of the cap or plug and is clamped to the partition plate 30 by the head of the plug. In accordance with certain features of the De Carbon applications, the bottom surface of the partition 30 is of a somewhat concave configuration so as to give a slight initial stress to the disc valve 41.

The useful novelty of the present invention in reducing emulsion and foaming of the working fluid within the expansion or cavitation chamber will now be described.

Either as an integral modification of the configuration of the baffle plate 20, or as a separately applied element (as in the illustrated embodiment), openings or passageways through the plate 20 are given a tortuous direction, whereby the initial axial flow of fluid therethrough is diverted horizontally and debouches into the upper portion B of the expansion chamber in a tangential direction, and preferably considerably below the main surface level of the liquid. In the embodiment illustrated in Figures 1, 2 and 3, the baffle 20 proper is provided with a series of openings 45 and a supplemental baffle or spout structure is provided which consists basically of a thin plate or disc 47 the margins of which are clamped along with those of the primary baffle element 20 between the two parts 10 and 11 of the casing. The disc or plate 47 is provided with a series of hoods or spouts 48 formed in the plate, for example, by die stamping or punching. One of these hooded spouts is disposed above each of the openings 45 and provides means for diverting the flow of liquid through the opening 45 from a vertical to a substantially horizontal direction, the general flow of the fluid being indicated by the arrow in Figure 3. During the punching of the portions 48 in the disc 47, one side of the hooded boss is of course slit and offset to provide the discharge orifice 50 for each of the hooded spout-like devices. Since these spouts 48 are directed tangentially of the chamber, as clearly shown in Figure 2 of the drawings, the fluid issuing therefrom upon the occurrence of the compression stroke of the piston sets up a swirl in the body of fluid in the chamber B and such an even swirling motion at the surface 19 will not disturb or roil the surface to any extent which would give rise to emulsion or foaming. It is possible that the centrifugal action of the cylindrical body of fluid might tend to raise the level at the margins of the dome 11, depress the level slightly at the center, but this in itself would not cause gushing or splashing such as would occur were the baffle openings directed upwardly within the expansion chamber.

In the embodiment illustrated in Figures 4, 5 and 6 of the drawings, the same principles are applied to a valving structure employed in a somewhat different type of direct acting shock absorber. The main cylinder of the work chamber is designated 10', the dome 11', and the junction of the two casing portions 13'. The working chamber is indicated by the letter A', and the expansion or cavitation chamber by the letter B'. The valved partition is indicated at 60 and is provided with a central passageway 61 which is countersunk somewhat as at 62 at its upper end. Into the lower end of the passageway is inserted the plug element 64 which is cut away at certain portions to provide passageways 65 therethrough and is urged in an upward direction by means of the stem 66, the head 67 of which bears against the plug 64. This plug serves to clamp the light spring valve 68 in the same fashion as described in connection with the valve 41 of the first embodiment. This valve 68 serves to control return flow through the passageways 70.

Upward flow upon the occurrence of the compression stroke is through the central passage 61 and this flow is controlled by the conical valve element 72 which seats upon the valve seat at the junction of the opening 61 and its countersunk extension 62. Seated within an indented portion of the upper surface of the partition 60 is an inverted dome 75 made of sheet material and having discharge openings 76 in the upper surface thereof preferably arranged in circular series. The dome 75 is provided with a central opening through which stem 66 extends and stop means 77 is provided on the outer portion of the stem to bind the whole assembly together and secure it in place.

On the top of the dome 75 there is disposed a spout or jet forming disc 80 quite similar to the member 47 of the previously described embodiment. This disc or plate 80 is stamped or punched to provide hooded spout-like bosses or projections 82 which may be arranged in circular series. The punching of these projections slits and displaces certain portions of the plate and provides laterally and tangentially directed orifices 83 whereby the direction of flow of fluid is indicated by the arrow in Figure 6. Thus the fluid in the cylindrical dome 11' is given a swirling or horizontal rotary motion and the fluid entering the chamber does not gush or splash in the chamber so as to cause foaming or emulsification.

In Figures 7 and 8 of the drawings there is illustrated an alternative form of jetting arrangement which has been found to be practical in either of the principal general embodiments of the invention. In this case the baffle partition is comprised of two plates 90 and 91 disposed face to face and each provided with punched-out hooded jetting or orifice structures indicated at 92 and 93. These respective structures are so disposed with relation to each other that the rounded root portions of the hoods are spaced apart sufficiently to provide an intermediate connecting duct portion 95 which is preferably at least of the same cross-sectional area as the other portions of the hood structures. The criterion herein, as in the other embodiments, of the effectiveness of the jet structure, is that the hooded portion be of sufficient length or be sufficiently offset from the inlet orifice thereof to ensure a radical change of direction of flow of the fluid whereby the jet may be directed in a substantially horizontal direction. In this particular embodiment this is provided for by the adequate elongation of the hooded portions which serves to space the outlet orifice and the inlet orifice of the arrangement sufficiently far from the vertical connecting portion as to prevent a mere angular or sloping distortion of the flow of fluid.

As examples of quite unsatisfactory arrangements where the jetting is effected only at an acute angle to the vertical, reference is made to Figures 9 and 10 of the drawings. In Figure 9 a punched-out hooded orifice indicated at 97 is provided in a single baffle plate or sheet 98, the arrangement resembling in general appearance the showings of Figures 3 and 6, but this device is faulty as will be be seen from the arrow in Figure 9 indicating the slightly angular direction of oil flow. Similarly, the double punched-out hooded arrangement 99 of Figure 10, while resembling the construction of Figures 7 and 8, is quite unsatisfactory in affording only a very slight angularity of the oil flow from the vertical.

It is understood that various changes and alterations may be made in the embodiments of the invention illustrated and described herein without departing from the scope of the invention as defined by the following claims.

Having thus described the invention, what is claimed as new and desired to be secured by Letters Patent is:

1. In a shock absorber for damping the movements of two members relatively to each other, a casing enclosing a working chamber and adapted to be secured to one of said members, a quantity of damping liquid contained in said chamber, a piston reciprocatable within the liquid in said chamber, a piston rod fixed to the piston, extending through a packed opening in said casing, and secured to the other of said members, an expansion chamber having a cylindrical side wall and a top wall at the upper portion of said casing, said expansion chamber adapted for the reception of overflow of damping liquid displaced from the working chamber by the entry of successive increments of piston rod into the working chamber upon the occurrence of a compression stroke of the piston, a baffle in said shock absorber having one or more passageways therein through which damping liquid must flow during said compression stroke, the liquid level in said expansion chamber being at all times such that said baffle is continually submerged in the liquid, and said passageway being angularly disposed within the body of liquid substantially beneath the surface thereof at all times, whereby damping liquid is jetted in the expansion chamber in a generally horizontal direction and tangentially with respect to the side walls thereof, a swirl is set up in said expansion chamber, but no splashing or gushing through the surface of said liquid occurs and thus foaming and emulsification are avoided, said angularly disposed passageway being tortuous in that the inlet portion is substantially vertically disposed and its discharge portion is substantially horizontally disposed and directed tangentially of the expansion chamber.

2. The shock absorber as set forth in claim 1 in which the inlet to said passageway is sufficiently offset laterally from the outlet to avoid a mere inclination of the jet from the vertical, and to definitely change the direction of upward flow to a substantially horizontal direction.

3. In a shock absorber for damping the movements of two members relatively to each other, a casing enclosing a working chamber and adapted to be secured to one of said members, a quantity of damping liquid contained in said chamber, a piston reciprocatable within the liquid in said chamber, a piston rod fixed to the piston, extending through a packed opening in said casing, and secured to the other of said members, an expansion chamber having a cylindrical side wall and a top wall at the upper portion of said casing, said expansion chamber adapted for the reception of overflow of damping liquid displaced from the working chamber by the entry of successive increments of piston rod into the working chamber upon the occurrence of a compression stroke of the piston, a baffle in said shock absorber having one or more passageways therein through which damping liquid must flow during said compression stroke, the liquid level in said expansion chamber being at all times such that said baffle is continually submerged in the liquid, and said passageway being angularly disposed within the body of liquid substantially beneath the surface thereof at all times, whereby damping liquid is jetted in the expansion chamber in a generally horizontal direction and tangentially with respect to the side walls thereof, a swirl is set up in said expansion chamber, but no splashing or gushing through the surface of said liquid occurs and thus foaming and emulsification are avoided, said baffle comprising a plate having a hooded orifice portion formed therein, said orifice portion adapted to receive fluid from beneath said baffle and direct the flow thereof substantially horizontally and tangentially of said expansion chamber.

4. In a shock absorber for damping the movements of two members relatively to each other, a casing enclosing a working chamber and adapted to be secured to one of said members, a quantity of damping liquid contained in said chamber, a piston reciprocatable within the liquid in said chamber, a piston rod fixed to the piston, extending through a packed opening in the casing, and secured to the other of said members, an expansion chamber having a cylindrical side wall and a top wall at the upper portion of said casing, said expansion chamber adapted for the reception of overflow of damping liquid displaced from the working chamber by the entry of successive increments of piston rod into the working chamber upon the occurrence of a compression stroke of the piston, a baffle in said shock absorber having one or more passageways therein through which damping liquid must flow during said compression stroke, the liquid level in said expansion chamber being at all times such that said baffle is continually submerged in the liquid, and said passageway being angularly disposed within the body of liquid substantially beneath the surface thereof at all times, whereby damping liquid is jetted in the expansion chamber in a generally horizontal direction and tangentially with respect to the side walls thereof, a swirl is set up in said expansion chamber, but no splashing or gushing through the surface of said liquid occurs and thus foaming and emulsification are avoided, the baffle being provided with hooded orifice portions upon both the upper and lower sides thereof, said hooded portions overlapping to provide substantially Z-shaped passageways through the baffle, the entrance to the passageway being substantially horizontal, the intermediate portion substantially vertical, and the outlet portion substantially horizontal.

5. The shock absorber as set forth in claim 4 in which the baffle comprises two juxtaposed plates, the outlet hooded orifice portion being formed on one of the plates and the inlet hooded portion formed on the other of said plates.

6. In a shock absorber for damping the movements of two members relatively to each other, a casing enclosing a working chamber and adapted to be secured to one of said members, a quantity of damping liquid contained in said chamber, a piston reciprocatable within the liquid in said chamber, a piston rod fixed to the piston, extending through a packed opening in said casing, and secured to the other of said members, an expansion chamber having a cylindrical side wall and a top wall at the upper portion of said casing, said expansion chamber adapted for the reception of overflow of damping liquid displaced from the working chamber by the entry of successive increments of piston rod into the working chamber upon the occurrence of a compression stroke of the piston, a baffle in said shock absorber having one or more passageways therein through which damping liquid must flow during said compression stroke, the liquid level in said expansion chamber being at all times such that said baffle is continually submerged in the liquid, and said passageway being angularly disposed within the body of liquid substantially beneath the surface thereof at all times, whereby damping liquid is jetted in the expansion chamber in a generally horizontal direction and tangentially with respect to the side walls thereof, a swirl is set up in said expansion chamber, but no splashing or gushing through the surface of said liquid occurs and thus foaming and emulsification are avoided, said baffle comprising a plate having a perforation therein and a supplemental sheath of sheet metal thereon, said sheath having a hooded orifice portion in the form of a spout, said spout disposed above said perforation and directed laterally and tangentially of said expansion chamber.

References Cited in the file of this patent

FOREIGN PATENTS

| | | |
|---|---|---|
| 671,712 | Great Britain | May 7, 1952 |
| 1,057,604 | France | Oct. 28, 1953 |
| 1,094,331 | France | Dec. 8, 1954 |